United States Patent Office 3,250,744
Patented May 10, 1966

3,250,744
HIGH MOLECULAR WEIGHT THERMOPLASTIC POLYCARBONATES AND PROCESS FOR THE PRODUCTION THEREOF
Hermann Schnell, Krefeld-Urdingen, and Heinrich Krimm, Krefeld-Bockum, Germany, assignors to Farbenfabriken Bayer Aktiengesellschaft, Leverkusen, Germany, a German corporation
No Drawing. Filed Oct. 8, 1957, Ser. No. 688,822
Claims priority, application Germany, Oct. 19, 1956, F 21,459; Nov. 14, 1956, F 21,662
7 Claims. (Cl. 260—47)

High molecular weight thermoplastic polycarbonates and process for the production thereof.

Technically valuable thermoplastic materials melting at elevated temperatures without decompostiion are obtainable according to the process disclosed in U.S. patent applications Ser. Nos. 461,938, filed October 12, 1954, and 557,256, filed January 4, 1956, by reacting di-monohydroxyarylene alkanes, and according to the process disclosed in U.S. patent application Ser No. 572,802, filed March 21, 1956, now Patent No. 3,136,741, by reacting mixtures of di-monohydroxyarylene alkanes and other dihydroxy compounds with derivatives of carbonic acid to form polycarbonates.

It has now been found that plastics having similar properties but an improved anchorage on ceramic, wooden or metallic bases may be obtained by reacting dihydroxydiarylene ethers or -thioethers, optionally in mixture with other aliphatic, cycloaliphatic or aromatic dihydroxy compounds in a corresponding manner to form polycarbonates.

The two aryl radicals in the dihydroxy-diarylene ethers or -thioethers used for the building up of the polycarbonates according to the invention, may be the same or different. The aryl radicals may further carry substituents which are incapable of reacting during the conversion into the polycarbonates, such as halogen, or alkyl groups such as the methyl-, ethyl-, propyl- or tert.butyl groups.

Suitable dihydroxy-diarylene ethers or -thioethers are, for example: 4,4'-dihydroxy-diphenylene ether, 4,4'-dihydroxy-2,2'-dimethyl-diphenylene ether, 4,4' - dihydroxy-3,3'-dimethyldiphenylene ether or their homologues, as well as 4,4'-dihydroxydiphenylene sulphide, 4,4'-dihydroxy-2,2'-dimethyldiphenylene sulphide, 4,4'-dihydroxy-3,3'-dimethyldiphenylene sulphide and their homologues. The latter are readily obtainable by condensation of sulphur dichloride with the corresponding phenols.

As dihydroxy compounds which may be used in admixture with the dihydroxy diarylene ethers and -thioethers there may be used all alkylene glycols and cycloalkylene glycols and all aromatic dihydroxy compounds so far as they do not have substituents that react under the reaction conditions with carbonic acid derivatives, especially dihydroxy diarylene alkanes, for instance as described in the U.S. applications Ser. Nos. 461,938, 557,256 and 572,802.

Special examples of such dihydroxy compounds are the following: ethylene glycol, diethylene glycol, triethylene glycol, polyethylene glycol, propanediol-1,2, and the di- or polyglycols prepared from propyleneoxide-1,2,
propanediol-1,3,
butanediol-1,3,
butanediol-1,4,
2-methylpropanediol-1,3,
pentanediol-1,5,
2-ethylpropanediol-1,3,
hexanediol-1,6,
octanediol-1,8,
2-ethylhexanediol-1,3, and
decanediol-1,10, quinitol,
cyclohexanediol-1,2,
o-, m- and p-xylyene glycol,
2,2-(4,4'-dihydroxy-dicyclohexylene)-propane,
2,6-dihydroxy-decahydronaphthalene,
hydroquinone, resorcinol, pyrocatechol,
4,4'-dihydroxydiphenyl,
2,2-dihydroxydiphenyl,
1,4-dihydroxynaphthalene,
1,6-dihydroxynaphthalene,
2,6-dihydroxynaphthalene,
1,2-dihydroxynaphthalene,
1,5-dihydroxyanthracene,
1,4-dihydroxyquinoline,
2,2-dihydroxynaphthyl-1,1',
o-, m- and p-hydroxybenzyl alcohol,
di-(monohydroxyarylene)-alkane such as (4,4'-dihydroxydiphhenylene)-methane,
2,2-(4,4'-dihydroxydiphenylene)-propane,
1,1-(4,4'-dihydroxydiphenylene)-cyclohexane,
1,1-(4,4'-dihyroxy-3,3'-dimethyl-diphenylene)-cyclohexane,
2,2-(2,2'-dihydroxy-4,4'-di-tert.butyl-diphenylene)-propane or
3,4-(4,4'-dihydroxydiphenylene)-hexane or
1,1-(4,4'-dihydroxydiphenylene)-1-phenyl-ethane;

further methane derivatives carrying in addition to two hydroxyaryl groups an alkyl radical with at least two carbon atoms and a second alkyl radical with one or more carbon atoms such as 2,2-(4,4'-dihydroxydiphenylene)-butane, 2,2-(4,4'-dihydroxydiphenylene) - pentane, 3,3-(4,4'-dihydroxydiphenylene)-pentane, 2,2-(4,4'-dihydroxydiphenylene)-3-methyl-butane, 2,2-(4,4'-dihydroxydiphenylene)-heptane and 2,2-(4,4'-dihydroxydiphenylene)-tridecane.

The new polyesters may be produced by methods known in the art per se, e.g., by poly-condensing, for example, bis-chloro-carbonic acid esters of dihydroxydiarylene ethers or -thioethers, optionally also mixtures of bis-chloro-carbonic acid esters of dihydroxydiarylene ethers or -thioethers and other dihydroxy compounds as described above, with dihydroxydiarylene ethers or -thioethers and, if desired, with mixtures of dihydroxydiarylene ethers or -thioethers and other dihydroxy compounds as described above. The poly-condensation may be carried out with advantage in the presence of inert solvents and acid-binding compounds such as tertiary amines as described for analogous processes in U.S. patent applications Ser. Nos. 461,938 and 557,256.

A further method of carrying out the process according to the invention consists in introducing phosgene either into an aqueous-alkaline solution or suspension of the dihydroxydiarylene ethers or -thioethers, if desired in the presence of other dihydroxy compounds and inert solvents, or into a solution or suspension of said compounds in inert solvents, if desired in the presence of acid-binding compounds such as tertiary amines also as described in U.S. patent applications Ser. Nos. 461,-938 and 557,256.

For either of the two methods of carrying out the process it is advantageous to add to the reaction mixture for accelerating the poly-condensation quaternary ammonium compounds in the form of the free bases or salts or of tertiary amines as described for analogous processes in U.S. patent application Ser. No. 557,256.

Finally, it is also possible to produce the new polycarbonates by interesterifying dihydroxydiarylene ethers or -thioethers, if desired in mixture with other dihydroxy compounds, preferably in the presence of acid or especially basic catalysts, with carbonic acid esters, for example dialkyl-, dicycloalkyl-, diaryl- or di-mixed carbonates also as described in U.S. patent applications Ser. Nos. 461,938 and 557,256. Suitable dialkyl, dicycloalkyl- and diaryl-carbonates are for instance: the dimethyl-, diethyl-, dipropyl-, dibutyl-, dicyclohexyl-, diphenyl- and dicresyl carbonate.

As di-mixed carbonates there may also be heated similarly to the process described in U. S. patent application Ser. No. 596,398 filed July 9, 1956, now Patent No. 2,946,766 bis-alkyl-, -cycloalkyl- or -aryl carbonates for instance bis-methyl-, -ethyl-, -propyl-, -butyl-, -cyclohexyl-, -phenyl- or -cresyl carbonates, of dihydroxydiarylene ethers or -thioethers by themselves or in mixture with such mixed carbonates of other dihydroxy compounds and optionally in mixture with free dihydroxydiarylene ethers or -thioethers or other dihydroxy compounds.

When using the basic catalysts for the aforesaid interesterification process, it is further advantageous to neutralise the catalysts in the course of the interesterification, preferably towards the end, by the addition of base-binding agents, especially volatile agents, to the melt in order to obviate the influence of the residual basic catalysts which may be detrimental, similarly to the process described in U.S. application Ser. No. 614,340 filed October 8, 1956, now Patent No. 3,022,272.

The polycarbonates produced according to the invention are high molecular weight thermoplastic materials whose softening point or melting point as well as their other physical properties substantially depend on the type of the dihydroxydiarylene ethers or -thioethers or on the kind and quantity of the dihydroxy compounds condensed with them. They are soluble in a number of organic solvents such as cyclopentanone, cyclohexanone, dimethylformamide, dioxane or methylene chloride, and may be processed from these solutions to give films or lacquer coatings.

The new polycarbonates generally melt at temperatures above 200° C. without decomposition. They may, therefore be worked up by pressing, spraying, flame-spraying or similar processes to form ureful mouldings or hard coatings having an especially good anchorage.

The especially good anchorage already mentioned may frequently be further improved by stoving.

The following examples are given for the purpose of illustrating the invention.

*Example 1*

A mixture of 178 grams (1 mol) of 4,4'-dihydroxydiphenylene ether (melting point 165–166°), 236 grams (1.1 mols) of diphenyl carbonate and 0.04 gram of the disodium salt of dihydroxydiphenylene ether are heated to 200° C. with vigorous stirring and passing over nitrogen under a pressure of 50–14 mm. mercury gauge, phenol distilling off. The residual phenol is finally removed by first heating during 1 hour to 220° C./0.5 mm. mercury gauge and further heating during 2 hours to 250° C./0.5 mm. mercury gauge. A colourless resilient plastic is thus obtained having a melting point of 230–235° C. It dissolves in dimethyl formamide, cyclopentanone, cyclohexanone and cresol. Stretchable filaments may be drawn and mouldings produced from the melt. Coatings applied by stoving to a base possess great hardness and anchorage.

*Example 2*

Into a solution of 192 grams (0.8 mol) of 2,2-(4,4'-dihydroxydiphenylene)-butane, 47 grams (0.2 mol) of 4,4'-dihydroxydiphenylene ether in 1640 grams of a 10 percent sodium hydroxide solution, 149 grams (1.5 mols) of phosgene are introduced upon the addition of 1 litre of methylene chloride, at 20° C. in a nitrogen atmosphere within 2 hours. After the addition of 0.5 gram of triethylamine and 4 grams of sodium isopropyl-naphthalene sulphonate, a viscous paste is formed in the course of about 2 hours. It is washed out in a kneader first with water, then with dilute hydrochloric acid and again with water, comminuted and dried under vacuum. A colourless resilient plastic material is thus obtained having a softening interval of 205–225° C. and which is soluble e.g. in methylene chloride, benzene, toluene, cyclohexanone and dimethyl formamide. It is especially suitable for the production of lacquer coatings and foils from solutions as well as for thermoplastic processing into mouldings of any kind.

*Example 3*

A mixture of 218 grams (1 mol) of 4,4'-dihydroxydiphenylene sulphide (melting point 151–152° C.), 260 grams (1.2 mols) of diphenyl carbonate and 0.04 gram of the disodium salt of dihydroxydiphenylene sulphide is heated to 180° C. rising to 200° C. with vigorous stirring and passing over of nitrogen under a pressure of 50–0.6 mms. mercury gauge, the bulk of the phenol distilling off. The residual phenol is finally removed by the gradual raising of the temperature (220° C./0.6 mm. mercury guage for 1 hour, 250° C./0.6 mm. mercury gauge for 2 hours and 270° C./0.6 mm. mercury gauge for 1 hour). A nearly colourless resilient plastic material is thus obtained having a softening interval of 220–240° C. It dissolves in dimethyl formamide, cyclopentanone, cyclohexanone, dioxan, and cresol. Stretchable filaments may be drawn and mouldings produced from the melt. The new plastic material is particularly distinguished by its resistance to cumbustion.

*Example 4*

Into a solution of 109 grams (0.5 mol) of 4,4'-dihydroxydiphenylene sulphide and 112 grams (0.5 mol) of 2,2-(4,4'-dihydroxydiphenylene)-propane in 1640 grams of a 10 percent sodium hydroxide solution, 149 grams (1.5 mols) of phosgene is introduced at 20° C. within 1½ hours after the addition of 600 grams of methylene chloride. Upon addition of 0.5 gram of triethylamine and 4 grams of sodium isopropylnaphthalene sulphonate a viscous paste is formed in the course of 1 hour. It is washed out in a kneader successively with water, dilute hydrochloric acid and again with water, comminuted and dried in vacuo. A colourless resilient plastic material is thus obtained having a softening interval of 240–260° C. and dissolving, e.g., in methylene chloride, chloroform, benzene, cyclohexanone and dimethyl formamide. It is suitable for the production of lacquer coatings and foils from the solution as well as for the thermoplastic processing into mouldings of any kind.

*Example 5*

Into a solution of 246 grams (1 mol) of 4,4'-dihydroxy-3,3'-dimethyldiphenylene sulphide (melting point 120–121° C.) in 1640 grams of a 10 percent sodium hydroxide solution, 149 grams (1.5 mols) of phosgene are introduced at 20° C. within 2 hours after the addition of 600 grams of methylene chloride. Upon addition of 0.5 grams of triethylamine and 4 grams of sodium isopropylnaphthalene sulphonate, a viscous past is formed in the course of 2–3 hours. It is washed out in kneader successively with water, dilute hydrochloric acid and again with water, comminuted and dried. A colourless resilient plastic material is thus obtained having a softening interval of 200–210° C. and dissolving, e.g., in methylene chloride, chloroform, benzene, toluene, and cyclohexanone. It is especially suitable for the production of barely combustible lacquer coatings and foils from solutions as well as for thermoplastic processing into mouldings of any kind.

We claim:

1. High molecular weight, linear, film and fiber forming, thermoplastic polycarbonates consisting solely of recurring organocarbonato units from about 20 to 100 mol percent of which are

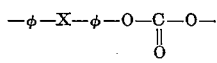

wherein X is sulfur and —φ— is arylene, and form about 80 to 0 mol percent of which are

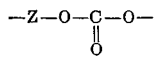

wherein —Z— is selected from the group consisting of arylene, alkylene, cycloalkylene, and

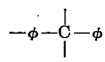

wherein the indicated free valences of

are satisfied by substituents selected from the group consisting of hydrogen and hydrocarbon radicals.

2. The linear high molecular weight polycarbonate as set forth in claim 1 wherein —Z— is

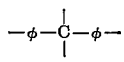

3. The linear high molecular weight polycarbonate of claim 1 wherein —φ— is phenylene and X is sulfur.

4. The linear high molecular weight polycarbonate of claim 1 wherein —φ— is methylphenylene and X is sulfur.

5. The linear high molecular weight polycarbonate of claim 1 wherein —Z— is

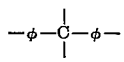

each —φ— is phenylene, X is sulfur and

is propylene.

6. A linear high molecular weight, resinous carbonate copolymeric product of the interaction of reactants consisting essentially of: (1) a carbonate precursor and (2) at least two different dihydric phenols, one of said dihydric phenols containing at least two aromatic groups bonded to each other by means of an ether linkage, and the other of said dihydric phenols being selected from the group consisting of monoaromatic phenols, dihydroxydiphenyls and polyaromatic phenols, the aromatic groups of which are bonded to each other by means of an alkylidene group; the sole reactive groups in said two different dihydric phenols being hydroxyl groups.

7. The product of claim 1 wherein said dihydric phenol containing at least two aromatic groups bonded to each other by means of an ether linkage constitutes at least 20% mol of the total dihydric phenols.

References Cited by the Examiner

UNITED STATES PATENTS

| | | | |
|---|---|---|---|
| 2,035,578 | 3/1936 | Wagner | 260—62 |
| 2,058,394 | 10/1936 | Arvin | 260—47 |
| 2,455,653 | 12/1948 | Bralley et al. | 260—77.5 |
| 2,789,972 | 4/1957 | Reynolds et al. | 260—77.5 |
| 2,799,666 | 7/1957 | Caldwell | 260—77.5 |

FOREIGN PATENTS

| | | |
|---|---|---|
| 532,543 | 10/1954 | Belgium. |
| 546,375 | 3/1956 | Belgium. |

OTHER REFERENCES

Schnell, "Angewandte Chemie," vol. 68, No. 20, pp. 633–640 (Oct. 21, 1956).

WILLIAM H. SHORT, *Primary Examiner.*

PHILIP E. MANGAN, MILTON STERMAN, HAROLD N. BURSTEIN, LOUISE P. QUAST, *Examiners.*

D. A. HOES, J. E. MUETH, R. A. BURROUGHS, J. T. BROWN, *Assistant Examiners.*